Patented May 24, 1949

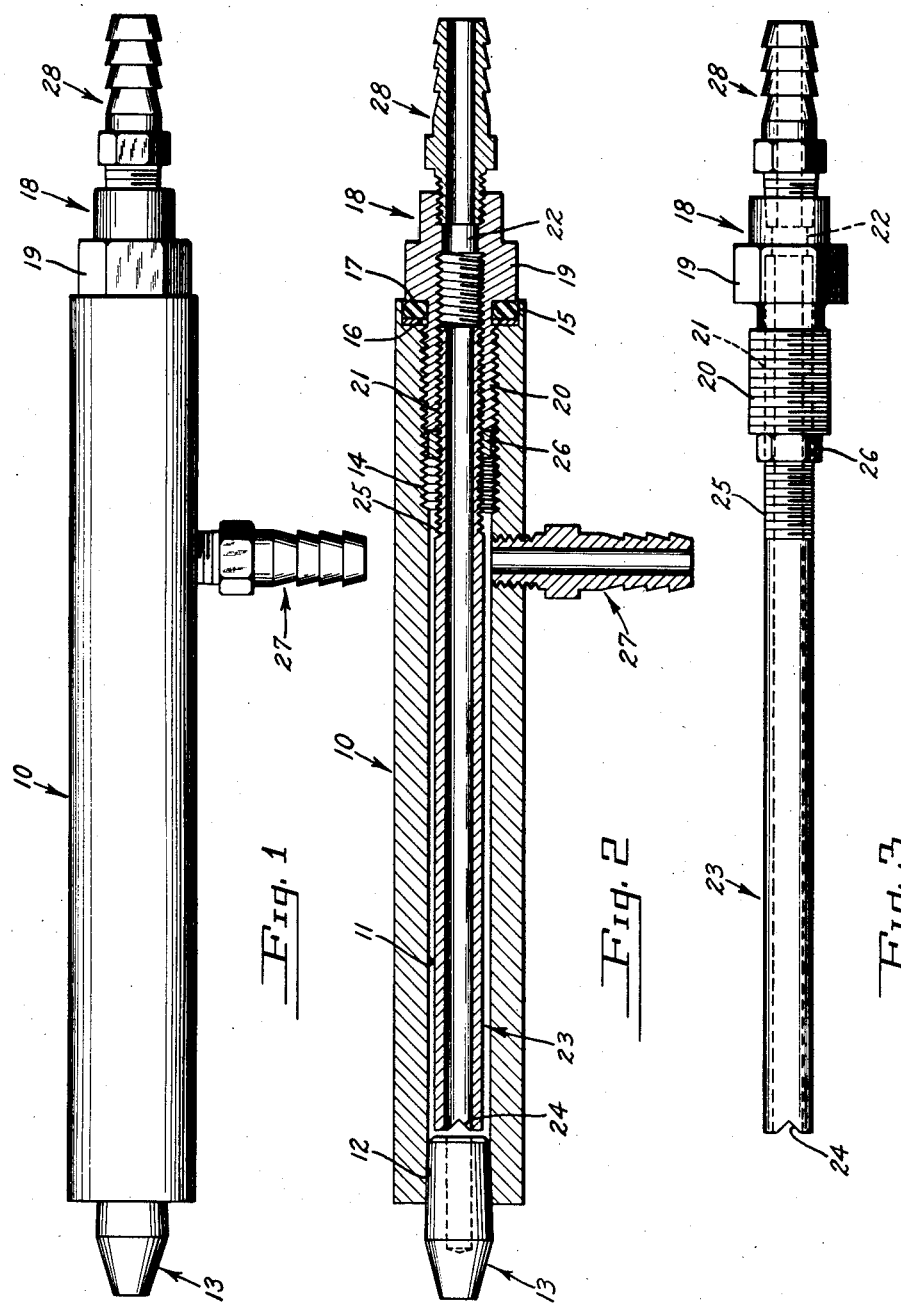

2,471,340

UNITED STATES PATENT OFFICE 2,471,340

ELECTRODE HOLDER

Robert F. Morrissey, South Britain, Conn.

Application August 6, 1948, Serial No. 42,899

6 Claims. (Cl. 219—4)

This invention relates to new and useful improvements in electrode holders and has particular relation to that type of electrode holder comprising a hollow body and a removable tip having a tapered fit in one end of the body.

An object of the invention is to provide an electrode holder of the character indicated and which is of simple and inexpensive construction and which incorporates a principle of construction including a twist-out ejector for the tip.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a side elevational view showing an electrode holder constructed in accordance with the invention;

Fig. 2 is a central longitudinal sectional view through the same; and

Fig. 3 is a side elevational view of a head and tube of the electrode holder removed from the body of the latter.

Referring in detail to the drawing, my improved welding electrode holder as shown comprises an elongated hollow body generally designated 10 and shown as in the form of a cylinder having an opening 11 extending longitudinally therethrough and opening through both its ends. At one end, the opening 11 is tapered providing a tapered socket 12 for the reception of any or the usual tapered tip 13.

Toward the other end of the body and through such other end, the walls of the passage 11 are threaded as at 14 whereby said body is internally threaded through its said other end. Also, in its other end portion, about the passage or opening 11, the body 10 is recessed or counterbored as at 15 and this counterbore or recess is shown as receiving a washer 16 which may be of any desired material as metal or the like and a compressible and expansible sealing ring 17 preferably of neoprene.

Assembled on the above mentioned other end portion of the body 10 is a head generally designated 18 and comprising a body 19 of a diameter to overly the said other end of the body and particularly to overly the compressible and expansible seal 17 and inwardly of such larger diameter portion an externally threaded stem 20. Stem 20 is of a diameter to be threaded into the internally threaded end portion of the body 10 as fully illustrated in Fig. 2 and, as shown in that figure, the threads 14 extend for a considerable distance so that the stem 20 may be threaded entirely into the internally threaded end portion of the body 10.

In addition to the external threads on its stem 20, the head 18 is internally threaded as at 21 and such threads 21 are carried entirely through the stem 20 and enter into the enlarged diameter portion 19 of the head. A passage 22 extends entirely through the head in the direction of the length of the latter. For convenience, the outer surface of the enlarged diameter portion 19 of the head 18 is provided with flats to be engaged by a wrench or other tool for the turning of the head and, as shown, is hexagonal.

Extending longitudinally in the opening 11 through the body 10 is a tube 23 which at its forward end is provided with lateral notches 24. This tube has an outside diameter less than the internal diameter of the body 10 or of less diameter than that of the passage 11. The notched or forward end of tube 23 is adjacent to the inner end of the tip 13. The rear end of the tube 23 is externally threaded for a considerable portion of its length and the extreme end portion of this threaded portion is threaded into the head 18, the engagement being between the external threads 25 of the tube 23 and the internal threads 21 of the head.

In making an assembly, the tube 23 is threaded to the desired extent into the head 18 and then a lock nut 26 on the threads 25 of the tube is run up and jammed against the end of the stem 20 so as to lock the tube and head together against any casual relative movement. When the tube is in place, it will be seen that the passage 22 through the head 18 communicates with the passage through the tube. The forward end of the tube or the end of the tube having the notches 24 is located close to the tip 13 and the construction described includes an adjustment. Thus, on release of the nut 26, the tube may be threaded more into the head 18 to reduce the effective length of the tube or the tube may be threaded partly out of such head to increase the effective length of the tube.

In the completed holder a nipple 27 is threaded into a tapped opening in the side of the body 10 as shown and a nipple 28 is threaded into the internally threaded outer end of the head 18. The tip 13 being in place, water or other coolant is admitted through the nipple 28 and moving through the passageway 22 in the head 18, enters the tube 23 and moves through the latter to the tip. A continuous flow of water is preferably established and this water keeps the tip to the proper temperature and passes back through the opening 11 in the body 10 about the outer surfaces of the tube 23 and exits through the nipple 27. In this connection, it will be understood that a supply hose or the like will be connected with the nipple 28 and a discharge hose connected with the nipple 27. The notches 24 in the forward end of the tube 23 insure of the escape of water from the tube so that a continuous circulation will be set up and even though the forward end of the tube is actually against the inner end of the tip 13, the water will not be sealed in the tube.

When using the disclosed welding electrode holder, the parts are assembled, as shown and described, and the stem 20 of the head 18 is threaded into the body 10 to locate the forward end of the tube 23 adjacent the tip 13 and to bring the enlarged diameter portion 19 of the head against the compressible and expansible sealing means 17. This means is thus compressed somewhat in the countersink 15 and serves to establish an effective water-tight seal to prevent the escape of water as from between the stem 20 and the rear end portion of the body 10.

The tips 13 are tightly wedged into the sockets 12. During use of the electrodes, these tips are forced tight into the sockets and when a tip loses its effectiveness or usefulness it must be removed and a new tip inserted in the socket. Many holders are designed to be struck a blow on their rear or inner end portions to drive some means against the tip to loosen it. Also, various tools have been provided for removing a tip from a holder.

According to the present invention, a tip is removed from the holder by a relative turning of the head 18 and the body 10. Thus, it is not necessary to strike any parts a blow as with a hammer or the like and it is not necessary to hammer a tip to loosen it. This latter practise, it will be understood, has a tendency to destroy the effectiveness of the socket 12.

With the present construction, when a tip is to be removed, the head 18 is turned relative to the body 10 to further thread the stem 20 into such body and to force the forward end of the tube 23 against the tip. The compressible and expansible gasket or sealing means 17, while being held in such a manner to effect a water seal, is yet capable of further compression on further threading of the stem 20 into the body 10. Thus, the seal permits of this additional threading together of the parts 10 and 18 and any such described relative movements of the parts results in a forward movement of the tube 23 so that the latter is forced against the tip 13 shifting it outwardly of its socket 12.

Since the tip is tapered and is received within the tapered socket, a very slight movement of the tip in the direction of its length releases all grip between the tip and the socket. Thus, I have found that approximately one-quarter of an additional turn of the head 18 will result in ejection of the tip from the socket and in the gasket 17 I provide for as much as an additional one-half turn of the head 18 relative to the body 10 beyond the point where an effective water-tight seal is provided between these parts by the gasket 17.

After the parts have been further threaded together to eject a tip they are given a reverse movement or there is a relative movement of the parts in a direction to retract the tube 23 into the body. This is to permit of the insertion of another tip into the socket 12. Since my sealing means or gasket 17 is expansible as well as compressible, when there is this reverse adjustment of the parts, said means expands and continues to fill the space between the enlarged diameter head portion 19 and the walls of the countersink 15 to maintain the desired water-tight seal.

From the foregoing, it will be seen that I have provided an electrode holder wherein a tip is released or ejected by a twist-out motion. That is, it is merely necessary to twist the head 18 relative to the body 10 to further thread the stem 20 of the head into the body and to shift the tube 23 forwardly to have it engage and force out the tip. A reverse relative turning movement of the parts 10 and 18 adapts the holder for the reception of another tip. Thus, it will be seen that my single tube 23 is both a water tube and a portion of a tip ejecting means.

A feature of the threaded connection between the tube 23 and the head 18 resides in the fact that not infrequently the sockets 12 become distorted. Then it is the practise to cut off a portion of the forward end of the body 10 and to ream the same to provide a new socket. When this is done, then the nut 26 is released and the tube 23 further threaded into the head 18 to reduce the effective length of the tube by an amount equal to the length of the body which was cut off. Then the present holder is ready for use.

Having thus set forth the nature of my invention, what I claim is:

1. In a welding electrode holder, a hollow elongated body having a tapered socket opening through one end to receive a tip, said body internally threaded through its other end, a head including a portion of a diameter over-lying the said other end of said body and an externally threaded stem threaded into said internally threaded end of the body, a tube extending longitudinally in said body and at one end lying adjacent said socket and at its other end threaded into said stem, a lock nut threaded onto said tube and abutting the inner end of said stem and securing said parts together against casual relative movement, said head having a passage therethrough communicating with said other end of said tube, said head and stem rotatable relative to said body to further thread the stem into the latter and force said tube against a tip to eject the latter from the socket, means between said head and the said other end of said body and forming a seal between said parts to prevent the escape of water from between them, and said means adapted for compression to permit of said further threading of the stem into the body to eject the tip by a thrust from said tube and then adapted for expansion to yet comprise a seal on reversal of said movement to retract the tube to permit of the mounting of another tip in said socket.

2. In a welding electrode holder, a hollow elongated body having a tapered socket opening through one end to receive a tip, said body being internally threaded through its other end, a head including a portion of a diameter overlying the said other end of said body and an externally threaded stem threaded into said internally threaded end of the body, a tube extending longitudinally in said body and at one end lying adjacent said socket and at its other end connected with said stem, said head having a passage therethrough communicating with said other end of said tube, said head and stem rotatable relative to said body to further thread the stem into the latter and force said tube against a tip to eject the latter from the socket, means between said head and the said other end of said body and forming a seal between said parts to prevent the escape of water from between them, and said means adapted for compression to permit of said further threading of the stem into the body to eject the tip by a thrust from said tube and then adapted for expansion to yet comprise a seal on reversal of said movement to retract the tube to permit of the mounting of another tip in said socket.

3. In a welding electrode, a hollow elongated body having a tapered socket opening through one end to receive a tip, a head threaded to the other end of said body and including a portion of a diameter overlying said other end of the body, a tube extending longitudinally in said body and at one end lying adjacent said socket and having its other end adjacent said head, said head having a passage therethrough communicating with said end of said tube, means between the mentioned portion of said head and the said other end of said body and forming a seal between such parts to prevent the escape of water from between them, said means compressible to permit of further threading together of said head and body to force the tube against a tip in said socket and eject said tip from the holder and thereafter expansible to yet comprise a seal on reversal of such threading movement to permit of reverse movement of said tube in said body to permit of the mounting of another tip in said socket.

4. In a welding electrode holder, a hollow elongated body having a tapered socket opening through one end to receive a tip, a coolant supplying tube in said body and having an outside diameter of less than the internal diameter of said body whereby there is a passage through the tube and also a passage between the outside of the tube and the walls of the passage through the body, means providing connections to supply water to said tube and receive it from the space between the tube and the walls of said passage, said tube having one end adjacent said socket, and means turnable on said body and operable to shift said tube longitudinally therein to have said tube engage the inner end of a tip and eject the latter from said socket.

5. The electrode holder as in claim 4 wherein said tube is connected with said means and the latter is turnable in one direction to shift said tube to have the same engage and eject a tip from said socket and is turnable in the opposite direction to retract the tube to permit of the insertion of a second tip into said socket.

6. The electrode holder as in claim 4 wherein said tube is connected with said means and the latter is turnable in one direction to shift said tube to have the same engage and eject a tip from said socket and is turnable in the opposite direction to retract the tube to permit of the insertion of a second tip into said socket, means effecting a water-tight seal between the first means and said body, and said means effecting a water-tight seal compressible and then expansible to maintain such seal while permitting of said turning movements of the first means.

ROBERT F. MORRISSEY.

REFERENCES CITED

The following references are of record in the file of this patent:

UNITED STATES PATENTS

| Number | Name | Date |
| --- | --- | --- |
| 1,784,384 | Paugh | Dec. 9, 1930 |
| 2,244,727 | Rutt | June 10, 1941 |
| 2,368,550 | Krintbosch | Jan. 30, 1945 |
| 2,385,108 | Seeloff | Sept. 18, 1945 |
| 2,443,052 | Mullen | June 8, 1948 |